Nov. 23, 1965  F. F. CHELLIS ETAL  3,218,815
CRYOGENIC REFRIGERATION APPARATUS OPERATING ON AN
EXPANSIBLE FLUID AND EMBODYING A REGENERATOR
Filed June 17, 1964  5 Sheets-Sheet 1

Walter H. Hogan
Fred F. Chellis
*INVENTORS*

BY
*Attorney*

Nov. 23, 1965 F. F. CHELLIS ETAL 3,218,815
CRYOGENIC REFRIGERATION APPARATUS OPERATING ON AN
EXPANSIBLE FLUID AND EMBODYING A REGENERATOR
Filed June 17, 1964 5 Sheets-Sheet 2

Walter H. Hogan
Fred F. Chellis
*INVENTORS*

BY
Attorney

Nov. 23, 1965 F. F. CHELLIS ETAL 3,218,815
CRYOGENIC REFRIGERATION APPARATUS OPERATING ON AN
EXPANSIBLE FLUID AND EMBODYING A REGENERATOR
Filed June 17, 1964 5 Sheets-Sheet 4

Walter H. Hogan
Fred F. Chellis
*INVENTORS*

BY

Attorney

Walter H. Hogan
Fred F. Chellis
INVENTORS

United States Patent Office 3,218,815
Patented Nov. 23, 1965

3,218,815
CRYOGENIC REFRIGERATION APPARATUS OPERATING ON AN EXPANSIBLE FLUID AND EMBODYING A REGENERATOR
Fred F. Chellis, Manchester, and Walter H. Hogan, Wayland, Mass., assignors to Arthur D. Little, Inc., Cambridge, Mass., a corporation of Massachusetts
Filed June 17, 1964, Ser. No. 375,721
19 Claims. (Cl. 62—6)

This invention relates to refrigerators and more particularly to refrigerators which develop refrigeration though the expansion of a compressed fluid and incorporate one or more regenerators.

The need for highly reliable, long-term, continuous-duty cryogenic refrigeration apparatus continues to grow. This need stems from the increasing use of masers and parametric amplifiers in communication systems, such as Telstar, satellite, or missile tracking systems; superconducting computer circuitry; and high-field-strength superconducting magnets—to cite but a few examples of their applications. These applications, which were only a few years ago confined to the laboratory or to experimental field use, are now the concern of the systems engineer and demand performances approaching one hundred percent reliability. For example, the retention of a billion-bit memory or the continuous operation of a satellite communication system depends on the reliable function of liquid-helium-temperature refrigerators. Cryogenic refrigeration apparatus of this type, suitable for such applications, should also combine simplicity of construction with high efficiency of operation.

There has recently been developed a new class of refrigeration apparatus operating on what might be considered to be two unique basic cycles. These cycles along with the earlier apparatus devised to perform the cycles are described in detail in U.S.P. 2,906,101 and U.S.P. 2,966,035. Various modifications of these apparatus and cycles have also been described such as in U.S.P. 3,045,436, 3,115,015 and 3,115,016. In general these cycles may be described as comprising the steps of supplying high-pressure fluid from an external source, initially cooling the high-pressure fluid by means of regenerators prior to expansion while maintaining the high-pressure level, and then finally further cooling the initially cooled high-pressure fluid through expansion and discharge from the refrigerator system.

In addition to these recently disclosed new basic refrigeration cycles there is in the prior art a cycle which may be referred to as a modification of that described by Taconis in U.S.P. 2,567,454 (see for example Proceedings of The 1956 Cryogenic Engineering Conference of the University of Colorado, Boulder, Colorado, February 1957, pp. 188–196). Finally there is also in the prior art the so-called Philips engine (see for example U.S.P. 2,657,553) which is based on the Stirling cycle and incorporates a compressor and expander within an entirely closed system and includes a regenerator as part of the heat exchange portion of the refrigerator.

In constructing apparatus to perform these various cycles it is necessary to provide for extremely efficient heat exchange in order to make apparatus which is thermodynamically efficient. In general an increase in heat transfer efficiency is accompanied by an increase in the complexity of construction and this has indeed been the case in the prior art apparatus. We have now found in the apparatus of this invention that we can attain the desired efficiency in heat exchange and increase in overall cycle performance while at the same time materially simplifying construction procedure and cost. This is achieved by locating the regenerator within the piston or displacer and providing a unique heat exchange flow path for the fluid within the refrigerator. This flow path includes a narrow annular passage between the lower end of the displacer or piston and the cylinder wall in which the displacer or piston operates. It also includes the attachment in heat exchange relationship of a high thermal conductive mass to effect heat transfer. This mass also should possess a high heat capacity to absorb temperature oscillations which are characteristics of the types of refrigeration devices under consideration.

It is therefore a primary object of this invention to provide an improved refrigeration apparatus of the type which depends for its operation on fluid expansion and intermediate heat transfer. It is another object of this invention to provide apparatus of the character described which is thermodynamically efficient and which at the same time is simple to construct. It is yet another object of this invenion to provide improved apparatus which lends itself to performing different refrigeration cycles. Other objects of the invention will in part be obvious and will in part be apparent hereinafter.

The invention accordingly comprises the features of construction, combination of elements and arrangement of parts which will be exemplified in the constructions hereinafter set forth, and the scope of the invention will be indicated in the claims.

For a fuller understanding of the nature and objects of the invention reference should be had to the following detailed description taken in connection with the accompanying drawings in which FIG. 1 is across-section of a portion of a refrigeration apparatus showing the general features of construction of this invention;

It will be apparent in the description of the various embodiments illustrated that all of the refrigeration apparatus shown and claimed are of the periodic flow type which incorporate a regenerator with either a piston or displacer. In the refrigeration cycles performed by these apparatus, a high-pressure expansible fluid is introduced through a regenerator and heat exchange path, with transfer of refrigeration external of the path, to an expanding chamber by movement of the displacer or piston. In the expanding chamber the fluid is allowed to drop to a lower pressure level to cool it and provide potential refrigeration which is recovered by its subsequent passage through the heat exchange path. This invention is applicable to all refrigeration apparatus and cycles which incorporate these basic steps in one form or the other.

In brief, this invention comprises the location of the regenerator within the piston or displacer and the providing of a narrow annular passage between the lower end of the displacer or piston and the internal wall of the cylinder which forms the enclosure in which the displacer or piston operates. Within this narrow annular passage serving as a heat exchanger there is developed a very high heat transfer coefficient due to the generation of high Reynolds numbers in the gas flow from the regenerator through the narrow annular passage into the expanding chamber. The other portion of this heat transfer system comprises a mass which is in thermal contact with the external wall of the cylinder and which exhibits high thermal conductivity for good heat transfer and high heat capacity to absorb temperature oscillations which are characteristic of these refrigeration devices due to the pulsating nature of their operation. Such a mass is preferably copper which possesses an optimum combination of these thermal properties within the cryogenic temperature range.

Figure 1:
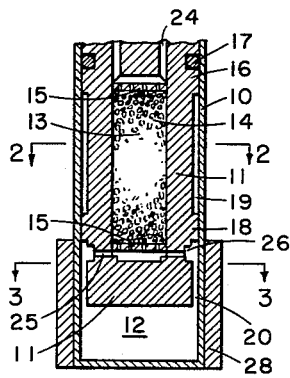
Figure 2:
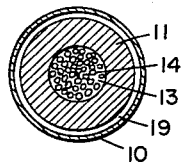
FIG. 2 is a cross-section along line 2—2 of FIG. 1.
Figure 3:
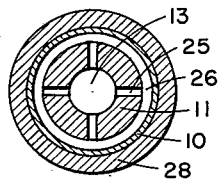
FIG. 3 is a cross-section along line 3—3 of FIG. 1.

FIGS. 1–3 illustrate the general features of the apparatus of this invention without reference to any particular type of refrigeration apparatus. It is in effect a cross-section of the lower portion of a typical apparatus, specific embodiments of which are illustrated in FIGS. 4, 6, 9, 10 and 12. This portion of a typical refrigerator is seen to comprise a suitable enclosure 10 which has within it a movable member 11 which in its vertical motion defines chamber 12 of variable volume. Within the movable member 11 is located a heat storage means such as a regenerator 13, shown in this illustration to comprise lead or bronze balls 14 held within the regenerator by a suitable retaining means such as a foraminous member 15. The movable member 11 is constructed to have a land 16 with a sealing ring 17 to effectively make the enclosure fluid tight. It also has a lower land 18 which defines with upper land 16 an annular channel 19, the purpose of which is to reduce the friction which may be developed between the movable member and the internal wall of the enclosure 10 and provide insulation for the system and isolation of chamber 12. Below the lower land 18 and the bottom of the movable member 11 there is defined a lower annular heat transfer passage 20 through which the cold high-pressure fluid passing down through regenerator 13 must move by way of radial outlet passages 25 and annular groove 26 to reach chamber 12 (FIG. 3). In like manner the cold expanded fluid must return through the regenerator by this same heat transfer passage to effect heat transfer with the bottom portion of the enclosure wall and hence with the heat station 28 which surrounds that bottom portion corresponding to the uppermost position which the radial passage 25 will reach when the movable member has attained its top dead center position. Finally, FIG. 1 illustrates one type of passage means by which fluid enters the top part of the regenerator 13. In this embodiment there are provided two opposed inlet conduits 24.

In the following descriptions it will be appreciated that the terms "upper" and "lower" are used in a relative sense and that the refrigeration apparatus illustrated may be oriented in any manner. These terms are employed in this description only for convenience and to correspond to the orientation illustrated in the figures.

Figure 4:
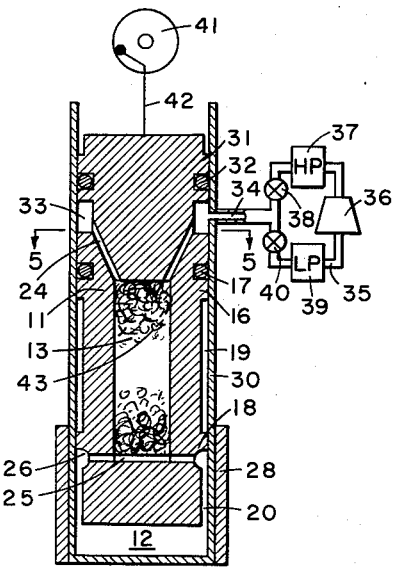
FIG. 4 is a cross-section of a refrigerator constructed in accordance with this invenntion and embodying the so-called "work" cycle using a single stage.
Figure 5:
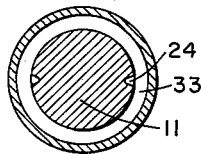
FIG. 5 is a cross-section along line 5—5 of FIG. 4.

FIGS. 4 and 5 illustrate the application of this invention to provide an apparatus operating on the so-called "work" cycle which is described in an annular groove 26 of suitable configuration which serves to distribute the cold high-pressure fluid around the entire periphery of the piston and into the narrow annular heat transfer passage 20 defined by the lower end of the piston 11 and the internal wall of the enclosure 30. This then provides the heat exchange fluid path into expansion chamber 12 and serves to further cool high-pressure fluid entering chamber 12 by virtue of refrigeration stored in the enclosure wall and heat station 28 during the preceding cycle when the cool low-pressure fluid during expansion was returned by this same heat exchange path through regenerator 13.

Figure 6:
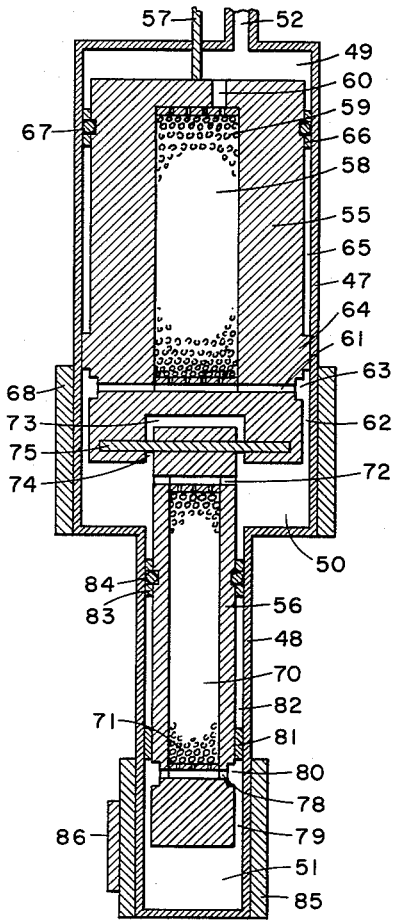
FIG. 6 is a cross-section of a refrigerator constructed in accordance with this invention using the so-called "no-work" cycle in a multistage apparatus.

FIG. 6 illustrates the application of this invention to a multistage refrigerator embodying the "no-work" cycle described in U.S.P. 2,966,035. This multistage apparatus is comprised of an upper large enclosure 47 and a lower smaller enclosure 48. Within it are defined a warm expandable volume chamber 49 and first and second cold expandable volume chambers 50 and 51, respectively. High-pressure fluid is introduced into and low-pressure fluid is discharged from the system into chamber 49 by way of suitable fluid conduit 52 which is in fluid communication with a fluid supply and discharge system such as illustrated in FIG. 4 and hence is equivalent to conduit 34 of that figure.

Operable within this enclosure of stepped configuration is an upper displacer 55 and a lower displacer 56 which are moved through a suitable drive shaft 57 by means not illustrated. Within the upper displacer is an upper regenerator 58 which may be filled with bronze balls 59 and which is in fluid communication with chamber 49 through passage 60. In the lower portion of displacer 55 at the point where regenerator 58 is terminated there are provided radial passages 61 which communicate with the first narrow annular heat transfer passage 62 through the annular groove 63 in the piston. This construction is similar to that shown in FIG. 3. The upper limit of this heat transfer passage 62 is defined by land 64 which is an integral part of the displacer and which makes an essentially fluid-tight seal with the internal wall of the upper enclosure 47. Above this is an annular space 65, a second detail in U.S.P. 2,906,101. In this figure like numbers refer to like components in FIG. 1. The refrigerator enclosure 30 of the apparatus of FIG. 4 here assumes a specific configuration, namely, one which is essentially open at the top and possesses an additional sealing land 31 and sealing ring 32 located above an annular channel 33 through which the fluid is introduced and discharged into the refrigerator. A fluid conduit 34 communicates with this annular channel 33 and with another fluid conduit 35 which incorporates a compressor 36, a high-pressure fluid reservoir 37, a high-pressure valve 38, a low-pressure reservoir 39 and a low-pressure valve 40. The operation of this cycle is described in detail in U.S.P. 2,906,101 and may here be briefly outlined as follows. High-pressure fluid is supplied to refrigerate chamber 12 from high-pressure reservoir 37 through valve 38 and conduit 34, over that portion of the cycle when the piston 11 is moving upward and chamber 12 is attaining maximum volume. Valve 40 is closed during this time when high-pressure fluid is being supplied. In the supplying of high-pressure fluid to chamber 12 it enters regenerator 13, which in this case may be filled with bronze wool 43, by way of inlets 24 and is cooled in regenerator 13 by virtue of the refrigeration stored in the bronze wool in the previous cycle. The high-pressure valve may be closed only when chamber 12 has reached maximum volume, or it may be closed shortly before the piston has reached top dead center.

At this point in the basic cycle there is cold high-pressure fluid in chamber 12 and the next step is to close valve 38 (if it has not already been closed) and open valve 40 to permit the expansion and further cooling of the fluid and its discharge into low-pressure reservoir 39 with the cooling of regenerator 13. The piston 11 moves downwardly and chamber 12 reaches its minimum volume. The cycle is then ready to begin again. Inasmuch as some mechanical work is delivered by the refrigerator there is provided a suitable energy absorbing means such as brake 41 which is mechanically fixed to the piston 11 through shaft 42.

The cold high-pressure fluid leaving the regenerator 13 is forced from the bottom of the regenerator through radial passages 25 of which there may be one or more (four being shown in FIG. 3). These radial passages terminate land 66 and a sealing ring 67 which serve to isolate chamber 49 from chamber 50. In accordance with the teaching of this invention a heat station 68 is associated with the bottom portion of the upper enclosure section 47.

In a similar manner the lower displacer 56 contains within it a regenerator 70 which may be formed of lead balls 71. The upper inlet to the regenerator 70 in this illustration comprises radial passages 72 which it will be seen are in fluid communication with the first cold chamber 50. In the apparatus of FIG. 6 the lower displacer 56 is attached to the upper displacer 55 through the use of a pin 75 which in turn creates a small volume 73 and an annular passage 74.

Associated with the lower end of the regenerator 70 are radial passages 78 which deliver fluid to the narrow annular heat exchange passage 79 through peripheral groove 80 in the displacer. Again the upper extent of the annular passage 79 is determined by a land 81 and the isolation of chamber 51 from chamber 50 is accomplished through the annular space 82. A second heat station 85 is associated with the bottom end of the lower enclosure and in this figure an external refrigeration load 86 is illustrated as being in thermal contact with the second heat station 85.

The cycle of this refrigerator differs from that of the apparatus illustrated in FIG. 4 in that there is a warm chamber and one or more cold chambers (in this case two) the volumes of which are controlled by the movement of a displacer driven by suitable external means. Heat of compression is developed in the warm chamber and the high-pressure fluid enters the upper regenerator and leaves the system at a temperature somewhat higher than that at which it was supplied. Thus the discharge fluid carries with it out of the system a quantity of heat which is substantially equivalent to the refrigeration developed.

In the apparatus of FIG. 6 there are provided two narrow annular heat exchange paths 62 and 79 associated with the first and second cold chambers 50 and 51 respectively. There are also provided the two heat stations 68 and 85, the role of which has been previously described.

Figure 7:
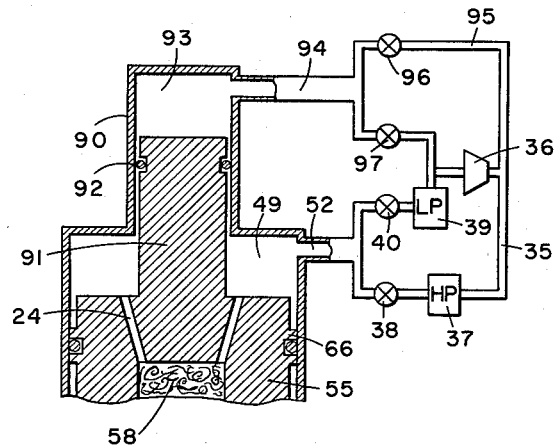
FIG. 7 is a cross-section of a modification of the upper portion of the apparatus of FIG. 6 illustrating the use of a driving volume.

FIG. 7 illustrates a modification of the apparatus in FIG. 6 in which the displacers are driven pneumatically in a manner similar to that described in a copending application Serial No. 322,782 filed in the name of Walter H. Hogan and assigned to the same assignee as this application. In this modification the apparatus includes an enclosure extension 90 and a displacer extension 91 which in effect can be construed to be a piston. A suitable sealing ring 92 is provided to isolate the warm chamber 49 from the driving volume 93 into which fluid is introduced and discharged to develop the necessary force upon the displacer extension 91 to drive the main displacer in the refrigerator. A suitable conduit 94 serves to introduce high-pressure fluid from reservoir 37 and then to discharge fluid into low-pressure reservoir 39 by way of conduit 95 and under the control of the high-pressure valve 96 and low-pressure valve 97. The pneumatic operation of the apparatus is not a part of this invention and the manner in which it achieves the necessary control over the displacer motion is described in detail in copending Serial No. 322,782.

Figure 8:
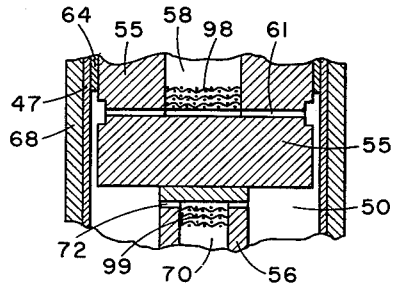
FIG. 8 is the modification of the apparatus of FIG. 6 wherein the two displacers are integral.

Finally, FIG. 8 illustrates another modification of the apparatus of FIG. 6 wherein like numbers refer to like components. In this modification the lower displacer 56 is in essence integral with the upper displacer 55. This figure also illusrates the use of stacked screens 98 and 99 in the regenerator in place of the bronze and lead balls used in the apparatus of FIG. 6.

Figure 9:
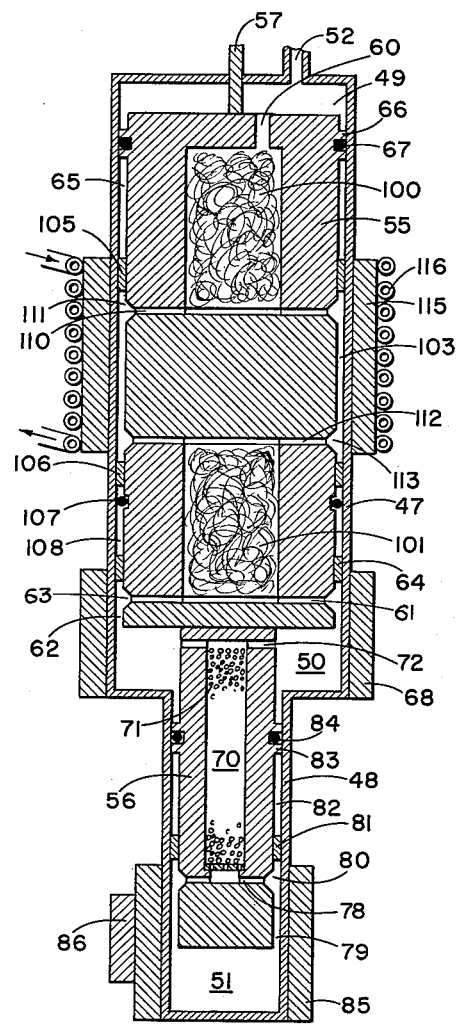
FIG. 9 is a cross-section of a refrigeration apparatus illustrating a modification of FIG. 6 incorporating cooling between the warm volume and the first cold volume of a multistage device.

The apparatus of FIG. 9 is a modification of that of FIG. 6 in that the upper displacer contains two regenerators 100 and 101 (which in this case are shown to be formed of bronze wool) having an additional annular heat exchange passage 103 connecting them. This passage is defined by an upper land 105 and a lower land 106 and isolation from the first cold volume 50 is assured through the use of an additional sealing ring 107 which with land 64 defines an annular dead space 108. This modification requires an additional heat transfer path between the lower end of regenerator 100 and the upper end of regenerator 101. This will be seen to be comprised of radial passages 110 annular groove 111, narrow annular passage 103, radial passages 112, and annular groove 113. Surrounding the enclosure at a position corresponding to essentially the extent of annular passage 103 is an intermediate heat station 115 which has associated with it cooling coils 116 adapted to circulate a cooling fluid such as liquid nitrogen. This means that there is in effect a precooling of the high-pressure fluid prior to its entrance into regenerator 101 and in its return through the system as low-pressure cold fluid. Additional heat transfer and refrigeration takes place prior to its entrance into the regenerator 100.

It is to be understood that the apparatus of FIG. 4 can be constructed as a multistage device as shown in FIGS. 6 and 9 and that the apparatus of FIG. 6 can be a single stage device as shown generally in FIG. 4. Regenerators may also be formed of various suitable materials the bronze wool, bronze and lead balls, and copper screens being cited as examples of various materials.

Figure 10:
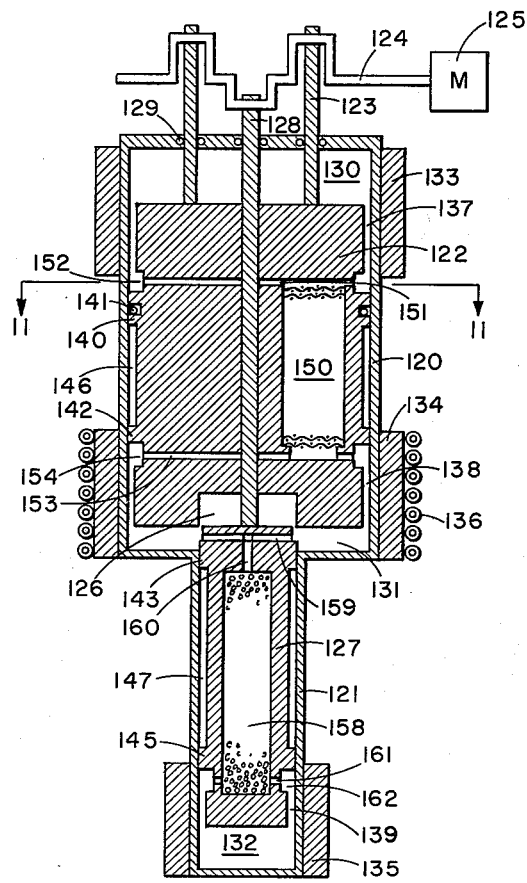
FIG. 10 is a cross-section of an apparatus constructed in accordance with this invention embodying a modified Taconis cycle.
Figure 11:
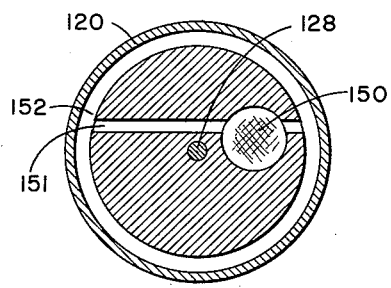
FIG. 11 is a cross-section of the apparatus of FIG. 10 along line 11—11.

FIG. 10 illustrates the apparatus of this invention as it may be applied to the performance of what may be referred to as a modified Taconis cycle as described in U.S.P. 2,567,454 and in the previously identified Proceedings of the 1956 Cryogenic Engineering Conference. Basically the cycle involves transferring an expansible fluid from a warm chamber to a cold chamber through an area of intermediate temperature. An improved apparatus for performing this cycle is described in copending U.S. application Serial No. 302,691 filed in the name of Walter H. Hogan and assigned to the assignee as this application. In the employment of this cycle for cryogenic refrigeration the warm end is conveniently maintained at essentially room temperature. The intermediate temperature is that essentially corresponding to liquid nitrogen while refrigeration is delivered at a lower temperature (e.g., 15–30° K.) depending upon the fluid used and the characteristics of the apparatus.

In FIG. 10 there is provided an upper enclosure 120 and a lower enclosure 121 formed in a stepped configuration similar to that of FIG. 6. Within upper enclosure 120 an upper piston 122 is moved through rods 123 which are connected to a suitable drive shaft 124 which in turn is driven by motor 125. Upper piston 122 has in its lower portion a recess 126 which is adapted to receive lower portion 127 which is driven by rod 128 also connected to drive shaft 124, the rods 123 and 128 passing through suitable seals 129 in order that the enclosures remain fluid tight.

Within the refrigerator enclosure there are defined a warm chamber 130, an intermediate-temperature chamber 131 and a cold chamber 132. Each of these chambers had associated with it a heat station, these being 133, 134 and 135, respectively. If chamber 130 is at essentially room temperature then heat station 133 is exposed to the atmosphere, while heat station 134, to be at an intermediate temperature, has associated with it cooling coils 136 which are adapted to circulate liquid nitrogen, or any other suitable cooling fluid to maintain chamber 131 at the required intermediate temperature. Each of these chambers also has annular heat exchange passages these being designated 137, 138, and 139 which are associated with heat stations 133, 134, and 135, respectively. Piston 122 is constructed with suitable land 140, sealing ring 141, and land 142; and piston 127 has lands 143 and 145. As in the case of the other apparatus illustrated the pistons are formed so as to define annular spaces 146 and 147 to reduce friction and serve as additional isolation zones between the chambers.

In the upper piston 122 is a regenerator 150 which has associated with it radial passages 151 and an annular groove 152 around the piston to provide the necessary fluid communication between the upper end of the regenerator 150 and the narrow annular heat exchange passage 137. In like manner communication with narrow passage 138 is by way of radial passages 153 and annular groove 154. In the smaller lower piston fluid enters from chamber 131 into the regenerator 158 through radial passages 159 and conduit 160 and fluid communication with passage 139 is achieved through radial passages 161 and annular groove 162.

Again as in the case of the apparatus previously described the narrow annular heat exchange passages 137, 138, and 139 provide very efficient heat transfer between the fluid and the heat stations which represent the temperatures to be maintained at these various points of the refrigerator.

In this cycle, as described in copending U.S. application Serial No. 302,691, net compression of gas occurs in chamber 131 and the heat of compression is removed from the gas in its passage through heat exchange path 138 by heat exchange to heat station 134 and refrigerant coils 136. Net expansion of gas occurs in chambers 130 and 132 and cooled gas leaving these chambers is warmed by passage through the annular heat exchange paths 137 and 139 by heat inputs from heat stations 133 and 135, the lower heat input at heat station 135 being termed refrigeration.

Figure 12:
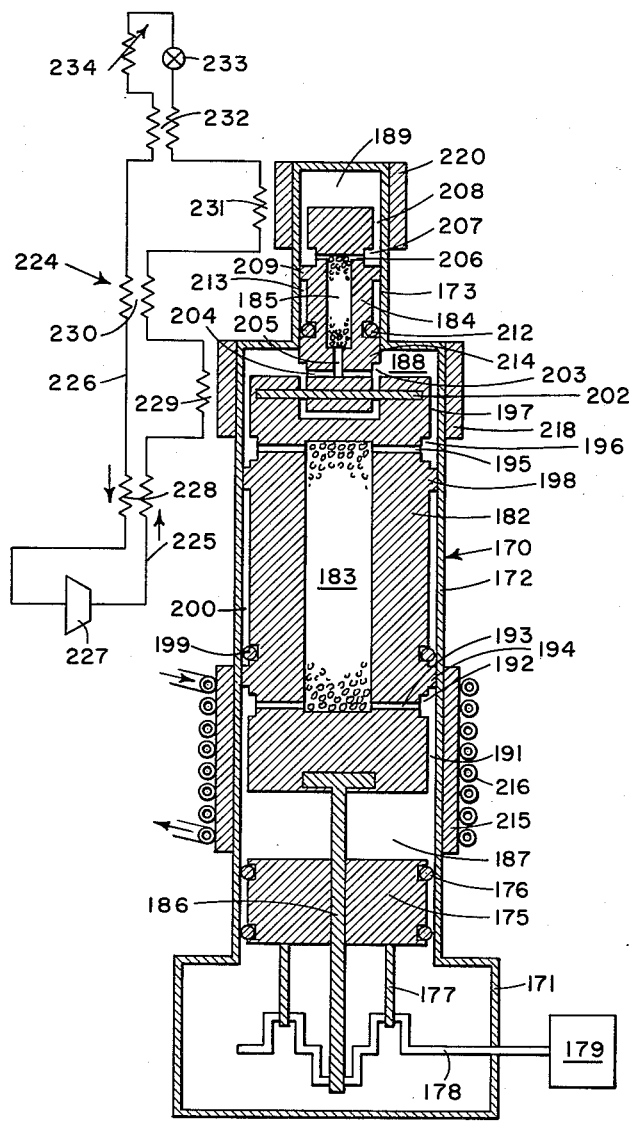
FIG. 12 is a cross-section of an apparatus constructed in accordance with this invention embodying a Philips modified Stirling cycle.

FIG. 12 illustrates the application of the apparatus of this invention to a Philips-Stirling cycle (described for example in U.S.P. 2,657,553) which is also a closed system wherein compression is achieved mechanically in contrast to its achievement by the addition of heat as ilustrated in the apparatus of FIG. 10. This closed system is contained within an enclosure generally indicated by the numeral 170 which consists of a bottom section 171 housing the drive mechanism, a central section 172 housing the compressor and a first expansion chamber, and an upper section 173 housing the second expansion chamber. A compressor piston 175 with suitable sealing rings 176 is driven through rods 177 from drive shaft 178 by motor 179. In the central portion there is a large expansion displacer 182 which contains a regenerator 183; and in the upper section there is a small expansion displacer 184 containing a regenerator 185, these pistons being driven by rod 186. In their movement within the enclosure, piston 175, and displacers 182 and 184 define a compressor chamber 187, a first expansion chamber 188, and a second expansion chamber 189.

It will be seen from FIG. 12 that in this case as in that of the other refrigerators described there are a series of unique fluid heat exchange flow paths. That path from the compressor chamber 187 to the regenerator 183 in the expansion piston is made up of the narrow annular heat exchange path 191 the peripheral groove 192, and the radial passages 193. The upper limit of the annular heat exchange path 191 is defined by land 194 on the piston. In a similar manner the fluid flow path from the top of regenerator 183 to chamber 188 or vice versa comprises radial passages 195, annular groove 196 and the narrow annular heat exchange path 197 which is limited by land 198. Isolation between the compressor chamber 187 and the first expansion chamber 188 is completed by sealing rings 199 and the annular space 200.

The two piston sections 182 and 184 are joined through pin 202 and above this is a suitable groove 203 which leads into radial passages 204 and then through conduit 205 into the regenerator 185. The communication between the first expansion chamber 188 and the colder expansion chamber 189 is by means of this fluid path, the regenerator 185, radial passages 206, annular groove 207, and narrow annular heat exchange passage 208 which terminates with land 209, which with sealing ring 212 annular space 213 and the fluid tight section 214 completes the isolation of chamber 189 from chamber 188. In order to cool the fluid which is compressed in chamber 187 and which contains heat of compression there is provided a heat station 215 with suitable cooling coils 216 adapted to circulate a cooling fluid such as liquid nitrogen or the like. By effecting efficient heat exchange between the compressed fluid moving within annular heat exchange passage 191 there is in effect achieved a form of intercooling. In like manner heat stations 218 and 220 are associated with the two expansion chambers and the annular heat exchange passages 197 and 208.

The cycle on which the refrigerator of FIG. 12 operates is not a part of this invention but it may be described briefly as follows. With the displacers in the up position the piston 175 is moved up causing compression of the gas in chamber 187. As the displacers 182 and 184 are moved downward to displace high-pressure gas from chamber 187 into low-temperature chambers 188 and 189 the piston continues to move upwards to maintain high pressure. When the chambers 188 and 189 are at maximum volume by the downward movement of displacers 182 and 184 the piston 175 is moved downward causing expansion of the gas in chambers 188 and 189. On full expansion of the gas the displacers 182 and 184 are moved upward to displace the expanded and cooled gas out of volumes 188 and 189, while the piston 175 continues to move downward to maintain low pressure. The idealized cycle described is in practice modified by the fact that both displacers and piston have a simple sinusoidal motion with a phase separation of about 90° in their motions which closely approximates the cycle described. As the gas is displaced from chamber 187 through regenerator 183 and 185, it is cooled. On expansion in chambers 188 and 189 the gas is further cooled and on being displaced back to chamber 187 passes through annular heat exchange paths 197 and 208 to provide refrigeration to heat station 218 and 220. The heat of compression is removed by passage of the gas on displacement from chamber 187 through annular heat exchange path 191 to heat station 215 and cooling fluid in coils 216.

If desired an external Joule-Thomson loop may be associated with the refrigeration apparatus of FIG. 12. This is shown in somewhat diagrammatical fashion and generally indicated by the numeral 224. It will be seen to consist of a high-pressure side 225 and a low-pressure side 226 in effect joined by a compressor 227. Out-of-contact heat exchange is achieved between high-pressure fluid and cool low-pressure fluid in heat exchanger 228, between high-pressure fluid and heat station 218 in heat exchanger 229, again between high-pressure and low-pressure fluid in heat exchanger 230, between the cooled high-pressure fluid and heat station 220 in heat exchanger 231, and finally between cold high-pressure fluid and the very cold low-pressure fluid resulting from expansion in heat exchanger 232. Expansion and final cooling takes place in a Joule-Thomson valve 233 and some refrigeration is given up to an external load 234 prior to the return of the cold low-pressure fluid through the low-pressure side and the heat exchangers enumerated.

From the description of the apparatus of this invention it will be seen that in refrigerators of the type under consideration there is provided an improvement in both the heat exchange efficiency which is achieved and in the simplicity of construction.

First with respect to the heat exchange efficiency, it will be appreciated that the placement of the regenerator or regenerators in the piston or displacer eliminates the construction of an external fluid path or the use of a regenerator which must be constructed in an annular form to surround the displacer or piston within the refrigerator enclosure as is shown for example in a copending application Serial No. 280,557 filed in the names of Hoffman, Hogan and Stuart and assigned to the same assignee as this application. Moreover, the placement of the regenerator within the piston or displacer permits the use of the unique heat transfer path disclosed, this path consisting of the radial passages which open into a peripheral groove which in turn forces the fluid into the narrow annular heat exchange passage defined between the displacer or piston and the internal walls of the enclosure. By limiting the fluid path from the end of the regenerator to the variable volume chamber (or another regenerator) in which it is in fluid communication to the small narrow passages the heat exchange between the surfaces involves is extremely high and therefore very efficient due to the high heat transfer coefficient caused by the generation of high Reynolds numbers in the fluid flow. Finally, the use of a heat station which is a mass of material in heat exchange contact with this heat exchange path permits the efficient exchange of heat to an external body, whether it is a refrigeration load or a refrigerating liquid. Finally, the heat station serves to absorb temperature oscillations which are characteristic of refrigeration devices in which there occurs a periodic flow of high-pressure fluid and its subsequent periodic expansion to effect cooling.

Second with respect to simplicity of construction it may be seen from the apparatus illustrated that the refrigerators of this invention may be made with what can be considered to be an almost minimum amount of construction effort. Techniques are of course well developed for forming pistons or displacers with the necessary lands, grooves, and seals and no difficulties are encountered in drilling radial passages or of obtaining the tolerances required. There is no need to attach external conduit systems for fluid flow paths nor is there any need for constructing within the enclosure annular shaped regenerators or heat stations. In the apparatus of this invention an interior volume of the piston or displacer may be filled with suitable regenerator material and sealed and the heat station wrapped around the exterior portion of the enclosure and affixed to it by such techniques as soldering or brazing. Thus there is provided a refrigerator which is simple to fabricate, assemble and maintain.

It will thus be seen that the objectives set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A cryogenic refrigerator in which a movable member defines within an enclosure at least one chamber of variable volume and in which a high-pressure expansible fluid is introduced through a fluid flow path, incorporating at least one heat storage means, into said chamber and is subsequently expanded and discharged through said fluid flow path characterized by having (a) said heat storage means within said movable member;
(b) said fluid flow path comprised of
   (1) a peripheral groove in said movable member;
   (2) at least one radial passage providing fluid communication between said heat storage means and said peripheral groove;
   (3) a narrow annular heat exchange passage defined by said movable member and the internal wall of said enclosure and extending from said groove to the end of said movable member; and
(c) a heat station in heat exchange contact with that portion of the exterior wall of said enclosure substantially corresponding to the extent of said narrow annular heat exchange passage as it is defined by the movement of said movable member.

2. A cryogenic refrigerator in accordance with claim 1 wherein said movable member is a piston having an annular channel adapted to receive and discharge said fluid from said enclosure and fluid conduit means communicating between said annular channel and said heat storage means.

3. A cryogenic refrigerator in accordance with claim 1 in which said movable member is a displacer defining within said enclosure a warm volume and at least one cold volume, said warm volume being connected to said cold volume by means of said fluid flow path.

4. A cryogenic refrigerator in accordance with claim 1 further characterized by being staged and having multiple movable members and multiple chambers of variable volume, each of said movable member having said fluid flow path associated therewith.

5. A cryogenic refrigerator in accordance with claim 4 wherein said movable members are pistons, the first of which has an annular channel adapted to receive and discharge said fluid from said enclosure and fluid conduit means communicating between said annular channel and the heat storage means in said first piston.

6. A cryogenic refrigerator in accordance with claim 4 wherein said movable members are displacers defining within said enclosure a warm volume and a multiplicity of successively colder volumes, said warm volume being connected to said cold volumes by means of said fluid flow paths.

7. A cryogenic refrigerator in accordance with claim 1 in which said movable member contains at least two heat storage means connected by an intermediate fluid flow path comprising spaced intermediate peripheral grooves in said movable member, radial passages providing fluid communications between said heat storage means and said spaced intermediate peripheral grooves and an intermediate narrow annular heat exchange passage defined by that portion of the movable member corresponding substantially to the spacing between said heat storage means and the internal wall of said enclosure, said refrigerator being further characterized by having a heat station in heat exchange contact with that portion of the exterior wall of said enclosure corresponding essentially to the extent of said intermediate narrow annular heat exchange passage as it is defined by the movement of said movable member.

8. A cryogenic refrigerator in accordance with claim 7 further characterized by having cooling coils in thermal contact with said heat station and adapted to circulate an externally supplied refrigerant.

9. A cryogenic refrigerator in accordance with claim 1 wherein said movable member is driven pneumatically by said fluid acting within a driving volume associated with an extension of said movable member.

10. A cryogenic refrigerator in which first and second separately actuated movable members define within an enclosure at least three chambers of variable volume, said first movable member defining the volume of a fluid compressor chamber and in part defining the volume of a first and warmest fluid expansion chamber, said second movable member defining in part the volume of said first expansion chamber and the volume of the remaining successively colder fluid expansion chambers, said fluid being circulated within said enclosure from chamber to chamber through fluid flow paths, said refrigerator being further characterized by having
- (a) a heat storage means within said first movable member;
- (b) a heat storage means within said second movable member between any one of said fluid expansion chamber and its adjacent fluid expansion chamber;
- (c) said fluid flow path between said fluid compressor chamber and said first fluid expansion chamber comprised of
  - (1) at least one radial passage leading from each end of said heat storage means in said first movable member to its perimeter;
  - (2) peripheral grooves in said first movable member in fluid communication with said radial passages therein;
  - (3) two narrow annular heat exchange passages defined by said first movable member and the internal wall of said enclosure and extending from said peripheral grooves to the ends of said first movable member;
- (d) said fluid flow path between any fluid expansion chamber and the next coldest fluid expansion chamber comprised of
  - (1) said heat storage means within said second movable member between the communicating expansion chambers,
  - (2) conduit means connecting said any expansion chamber and one end of said heat storage means,
  - (3) radial passage means providing fluid communication from the other end of said heat storage means to the perimeter of said second movable member,
  - (4) a peripheral groove in said second movable member in fluid communication with said radial passage means, and
  - (5) a narrow annular heat exchange passage defined by said second movable member and the internal wall of said enclosure and extending to said next coldest chamber; and
- (d) heat stations located external of said enclosure and in thermal contact through the wall of said enclosure with said fluid in said narrow annular heat exchange passages and in said chambers.

11. A cryogenic refrigerator in accordance with claim 10 further characterized by having out-of-contact heat exchange means in thermal contact with said heat station associated with said first fluid expansion chamber and adapted to circulate a fluid therethrough.

12. A cryogenic refrigerator in which a movable member defines within an enclosure at least two chambers of variable volume, in one chamber of which an elastic fluid at low pressure is subsequently compressed and in the other chamber of which said elastic fluid at high pressure is subsequently expanded, said fluid being circulated within said enclosure between said two chambers through a fluid flow path, said refrigerator being further characterized by having
- (a) a heat storage means within said movable member;
- (b) said fluid flow path comprised of
  - (1) at least one radial passage leading from each end of said heat storage means through said movable member;
  - (2) peripheral grooves in said movable member in fluid communication with said radial passages;
  - (3) two narrow annular heat exchange passages defined by said movable member and the internal wall of said enclosure and extending from said peripheral grooves to the ends of said movable member; and
- (c) heat stations in heat exchange contact with those portions of the exterior wall of said enclosure substantially corresponding to the extent of said narrow annular heat exchange passages as they are defined by the movement of said movable member.

13. A cryogenic refrigerator in accordance with claim 12 further characterized by having associated with said one chamber wherein said fluid is compressed a piston adapted to effect the compression.

14. A cryogenic refrigerator in which a movable member formed of at least two staged sections defines within an enclosure at least three chambers of variable volume, in one chamber of which an elastic fluid at low pressure is subsequently compressed and in the other chambers of which said elastic fluid at high pressure is subsequently expanded, said fluid being circulated within said enclosure between said chambers through a succession of fluid flow paths, said refrigerator being further characterized by having
- (a) heat storage means within each section of said movable member;
- (b) each of said fluid paths comprised of
  - (1) passage means communicating between the ends of said heat storage means through said movable member to its perimeter,
  - (2) peripheral grooves in said movable member adapted to effect fluid communication with those of said passage means which do not communicate directly with one of said chambers, and
  - (3) narrow annular heat exchange passage defined by said movable member and the internal wall of said enclosure and extending from said peripheral grooves to the one of said chambers which is adjacent thereto; and
- (c) heat stations associated with said chambers and in heat exchange contact with those portions of the exterior wall of said enclosure substantially corresponding to the extent of said narrow annular heat exchange passages as they are defined by the movement of said movable member.

15. A cryogenic refrigerator in accordance with claim 14 further characterized by having heat exchange means associated with at least one of said heat stations and adapted to effect out-of-contact heat exchange with a fluid circulating therein.

16. A cryogenic refrigerator in accordance with claim 15 wherein said heat exchange means is associated with each of said heat stations, that with said heat station associated with said chamber in which said fluid is compressed being adapted to circulate an externally supplied refrigerant and that with said heat stations associated with said chambers in which said fluid is expanded being part of a Joule-Thomson loop.

17. A cryogenic refrigeratior in accordance with claim 14 further characterized by having associated with said one chamber wherein said fluid is compressed a piston adapted to effect the compression.

18. A cryogenic refrigerator in which a movable member defines within an enclosure at least one chamber of variable volume and in which a high-pressure expansible fluid is introduced through a fluid flow path, incorporating at least one heat storage means, into said chamber and is subsequently expanded and discharged through said fluid flow path, characterized by having
- (a) said heat storage means within said movable member; and
- (b) said fluid path comprised of
  - (1) a narrow annular heat exchange passage defined by said movable member and the internal wall of said enclosure, and
  - (2) fluid conduit means communicating between said heat storage means and said narrow annular heat exchange passage.

19. A cryogenic refrigerator in accordance with claim 18 further characterized by having a heat station associated with said narrow annular heat exchange passage external of said enclosure and in thermal contact therewith.

References Cited by the Examiner
UNITED STATES PATENTS

| | | | |
|---|---|---|---|
| 445,904 | 2/1891 | Robinson | 60—24 |
| 1,675,829 | 7/1928 | Smith | 60—24 |
| 2,397,734 | 4/1946 | Goebel | 60—24 |
| 3,091,092 | 5/1963 | Dros | 62—6 |
| 3,101,596 | 8/1963 | Rinia | 62—6 |

References Cited by the Applicant
UNITED STATES PATENTS

| | | |
|---|---|---|
| 2,567,454 | 9/1951 | Taconis. |
| 2,657,553 | 11/1953 | Jonkers. |
| 2,906,101 | 9/1959 | McMahon et al. |
| 2,966,035 | 12/1960 | Gifford. |
| 3,045,436 | 7/1962 | Gifford et al. |
| 3,115,015 | 12/1963 | Hogan. |
| 3,115,016 | 12/1963 | Hogan. |

WILLIAM J. WYE, *Primary Examiner.*